United States Patent [19]

Svetlik et al.

[11] Patent Number: 5,318,392

[45] Date of Patent: Jun. 7, 1994

[54] ADJUSTABLE FENCE FOR DRILL PRESS

[75] Inventors: Kenneth Svetlik, Schaumburg; Terry Treacy, Lindenhurst; Robert Anderson, Arlington Heights, all of Ill.

[73] Assignee: S-B Power Tool Company, Chicago, Ill.

[21] Appl. No.: 101,292

[22] Filed: Aug. 9, 1993

[51] Int. Cl.[5] .............................................. B23B 47/00
[52] U.S. Cl. ..................................... 408/103; 33/632; 33/642; 269/58; 269/71; 269/78; 269/291; 408/104
[58] Field of Search ............. 408/75, 90, 91, 103, 408/104; 269/45, 55, 56, 57, 58, 59, 71, 78, 77, 81, 249, 291, 315; 33/630, 632, 638, 642

[56] References Cited

U.S. PATENT DOCUMENTS

| | | | |
|---|---|---|---|
| 2,383,201 | 8/1945 | Kruchten | 269/81 |
| 2,471,940 | 5/1949 | Dion | 408/103 |
| 3,185,470 | 5/1965 | Zitner | 408/103 |
| 5,102,270 | 4/1992 | Warren | 408/103 |

*Primary Examiner*—Daniel W. Howell
*Attorney, Agent, or Firm*—Jones, Day, Reavis & Pogue

[57] ABSTRACT

A drill press assembly including a spindle supported by a column and base, a work table and an adjustable fence assembly. The adjustable fence assembly includes clamping means permitting the fence to be adjustably mounted on the column of the drill press. The fence includes a vertically oriented planar surface. Clamping means permit the planar surface to be adjusted in an infinite number of vertical and horizontal positions thereby to facilitate positioning of a workpiece for precise drilling operations. A V-block may be mounted to the fence to facilitate drilling into the end of a cylindrical workpiece.

6 Claims, 5 Drawing Sheets

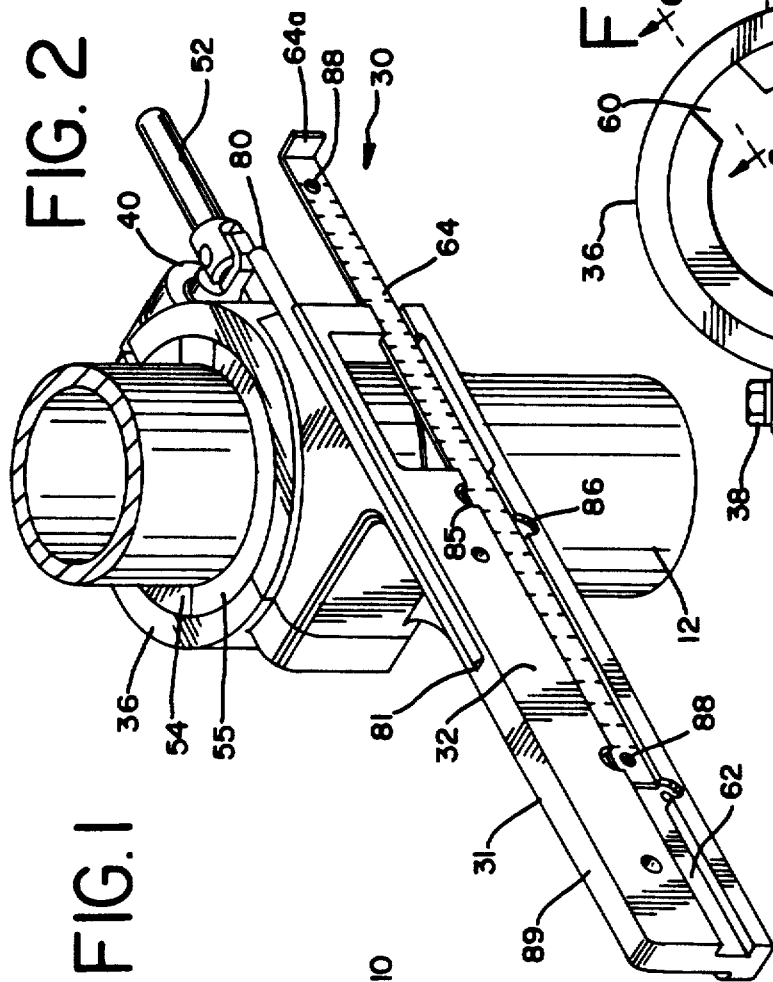
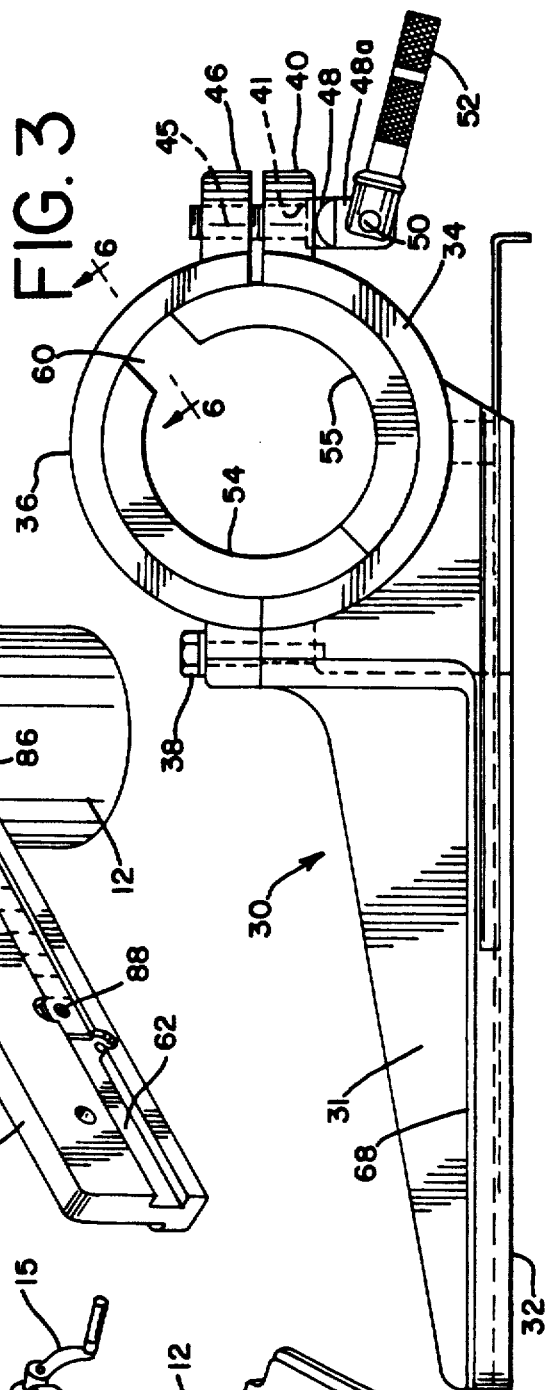
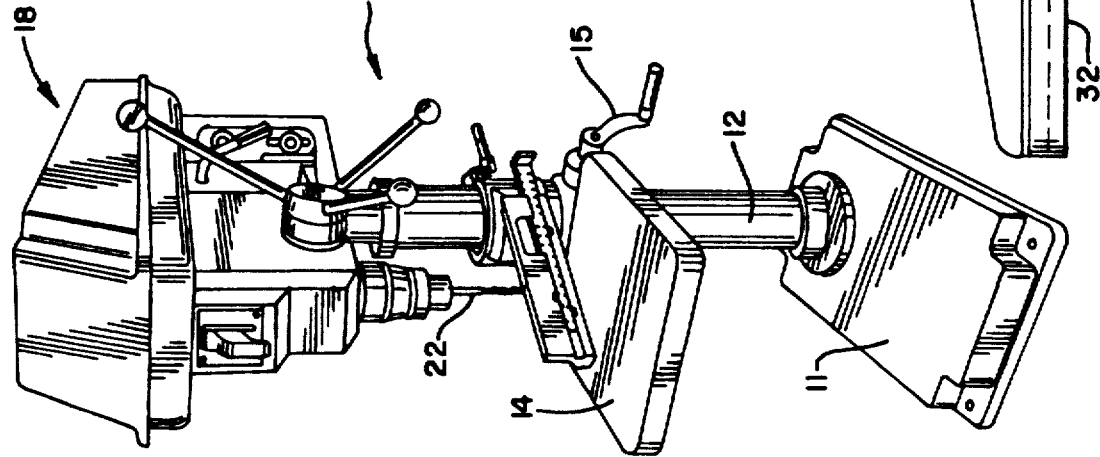

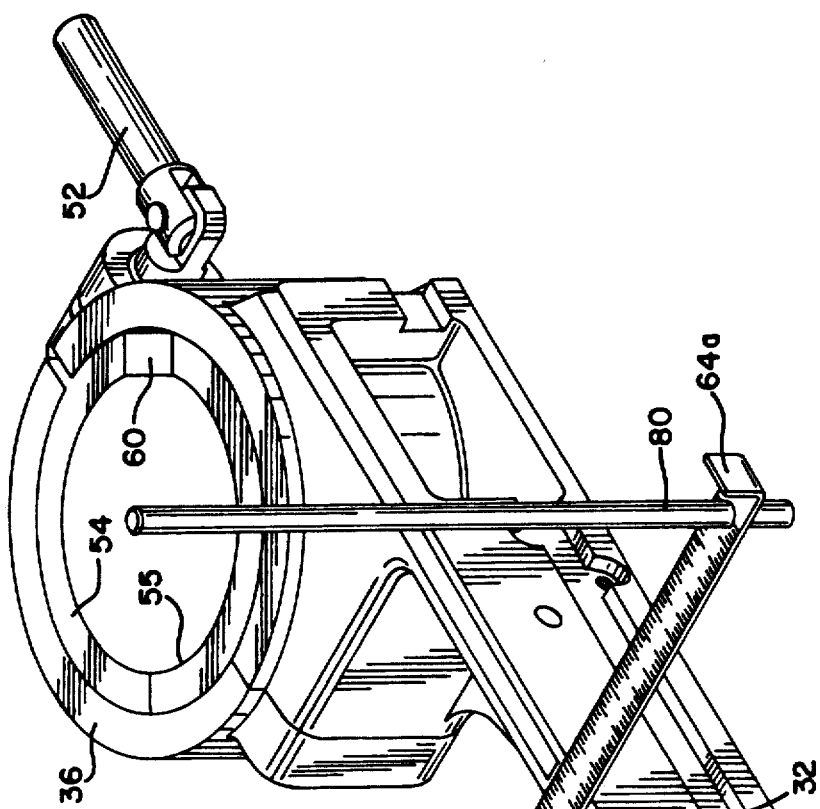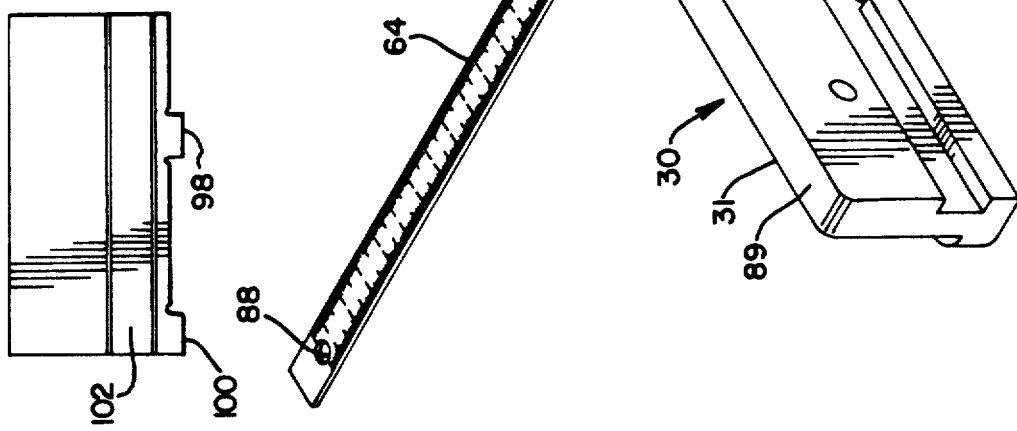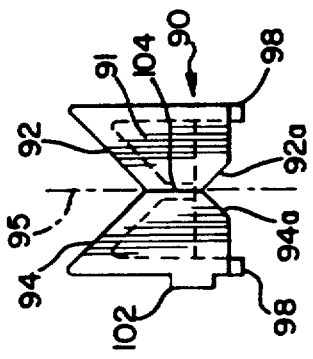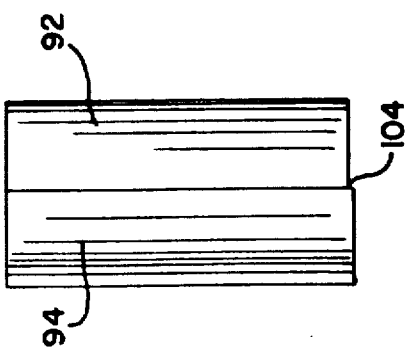

ADJUSTABLE FENCE FOR DRILL PRESS

FIELD OF THE INVENTION

The present invention relates to a drill press. In particular, the present invention relates to an adjustable fence for supporting the workpiece at the desired position beneath the spindle of the drill press.

BACKGROUND OF THE INVENTION

Drill press operations require precise positioning of a workpiece to enable drilling in the desired locations. The workpiece must be clamped or fastened in place during drilling to prevent slippage of the workpiece from the precise position necessary to permit the hole to be drilled in the desired location. In addition, the workpiece often is moved between drilling operations to produce a pattern of drilled holes in the workpiece. This requires repetitive set-up, layout and fastening of the workpiece.

To facilitate such positioning and fastening, various types of indexing and layout jigs and clamping mechanisms have been used. Examples of such drilling jigs and set-up tools are disclosed in the following U.S. Pat. Nos. 2,273,954, entitled Drill Jig; 2,602,238, entitled Boring Jig or Drill Guide; 3,775,857, entitled Set-up Tool; and 4,137,003, entitled Drill Jig. While the devices disclosed in these patents may be useful for the production of complicated drilling patterns, they are cumbersome for simple patterns and repetitive drilling operations using a drill press.

Other known devices used for such tasks are drill press vices typified by Dayton drill press vice No. 3W761 and 3W766. These drill press vices, however, by nature are relatively heavy, thus making set-up somewhat more difficult. Also, because these drill press vices are not fixed to any point or axis common to the drill press assembly, positioning with respect to the drill bit requires external measurement. Such measurement and placement may be time-consuming, and may introduce errors into the drilling operation.

SUMMARY OF THE INVENTION

The present invention provides greater flexibility and efficiency in positioning a workpiece relative to the bit of a drill press than previously known or disclosed in the art. The present invention relates to a drill press assembly including a spindle supported by a column and base, a worktable and a fence wherein the fence is adjustably mounted on the column. The fence includes a planar structure which is perpendicular to the worktable. The fence may also include a measuring scale, a set-up rod, an adjustable stop, and a clamp and bushing for attachment to the column. Further, the fence is preferably associated with a novel V-block to facilitate precision drilling in cylindrical and other workpieces.

The present invention facilitates drilling of the workpiece with a minimum of set-up time. The fence inherently provides a vertically oriented planar clamping support which may be adjusted, both vertically and horizontally for securing the workpiece prior to drilling. The fence further provides an inherent reference in relation to the vertical axis of the drill bit. In this way, the fence enables the workpiece to be drilled repeatedly along an axis parallel to the horizontal axis of the fence. The fence further facilitates repeat drilling of many identical workpieces by enabling the workpieces to be positioned quickly in reference to the drill bit.

DESCRIPTION OF DRAWINGS

FIG. 1 is a perspective view showing the drill press assembly including a spindle, a supporting column, a base, a worktable and a fence according to the present invention;

FIG. 2 is an enlarged perspective view showing the fence adjustably mounted to the column of the drill press assembly;

FIG. 3 is a top plan view showing the fence removed from the drill press for the purpose of better illustrating the present invention;

FIG. 7 is an end view of the V-block which is adapted for conjoint operation with the fence;

FIG. 8 is a side view of the V-block;

FIG. 9 is a top view of the V-block;

FIG. 10 is an isometric view showing how the fence may be positioned for one mode of operation;

DESCRIPTION OF THE INVENTION

Figure 4:
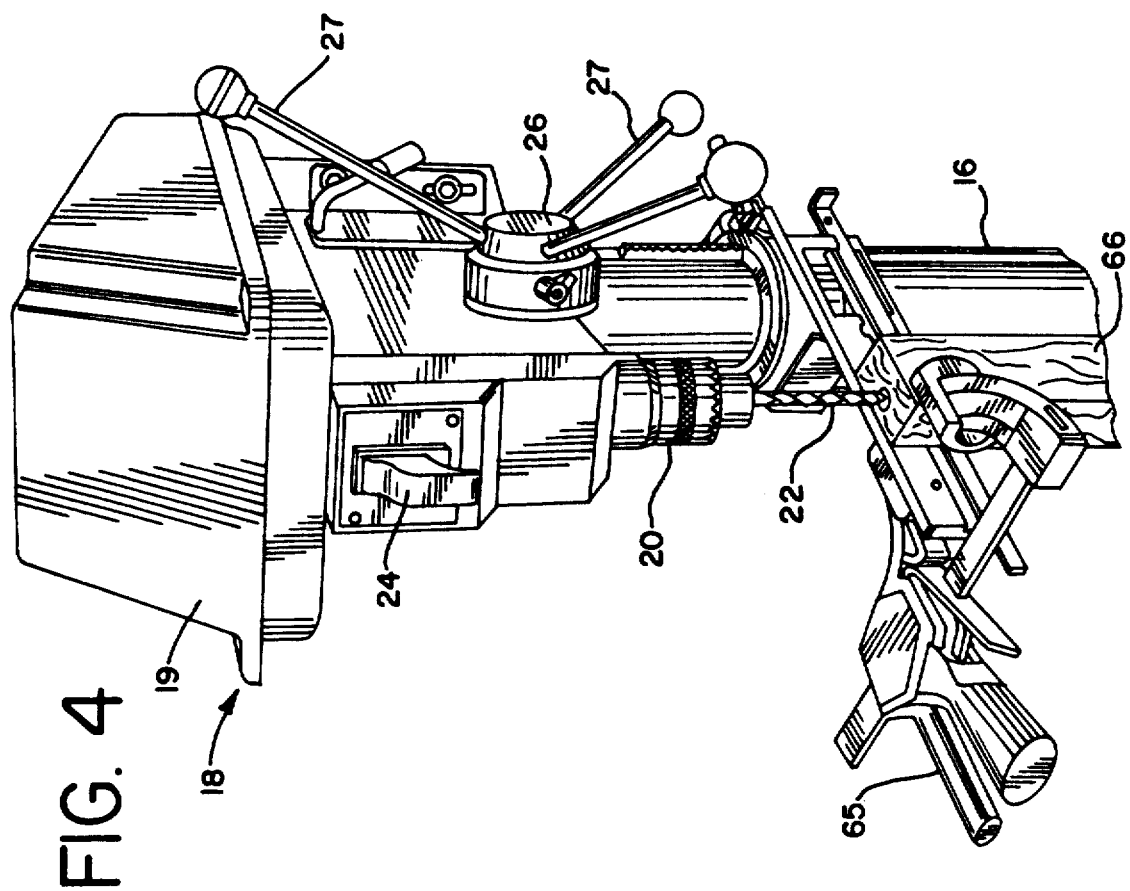
FIG. 4 is a perspective view showing the spindle, column and fence of the present invention with a workpiece mounted to the fence to illustrate the manner in which the fence facilitates positioning of the workpiece relative to the drill press.

Referring now to the drawings and, in particular, to FIGS. 1 and 4, a drill press, generally designated 10, includes a base 11 supporting a column 12. The drill press includes the usual worktable 14, which is mounted on the column for vertical movement thereby to permit the operator to locate the worktable at the desired vertical position. In this regard, a manually operated crank 15 is provided. This crank operates a gear (not shown) which meshes with the gear rack 16, the latter extending throughout substantially the entire length of the column.

A motor and drill bit assembly, generally designated 18, is adjustably supported at the upper end of the column. This assembly includes a housing 19 mounting the motor drive and belt assembly (not shown) for rotating the drill bit spindle 20. Spindle 20, of conventional construction, is adapted for releasable engagement with drill bits of varying diameters, one such drill bit being illustrated and designated 22. The assembly 18 further includes a switchcover 24 which covers the switch for energizing the motor powering the spindle 20.

The motor and drill bit assembly 18 includes rotatable hub 26 mounting a plurality of operating levers 27. Rotation of the hub 26 causes actuation of gearing to permit the drill bit spindle to be vertically adjusted at the desired location above the workpiece.

Referring now to FIGS. 2 and 3 in particular, the adjustable fence of the present invention, generally designated 30, is seen to include a body member 31 having a planar surface 32. The body member includes an integral semi-circular formation 34. A similar semi-circular formation or part 36 is releasably connected to the body member 31 by one or more fasteners 38. The formation 34 includes an integral lug 40 having a threaded bore 41. Similarly the removable part 36 includes an integral lug 44 having a threaded bore 45.

A threaded bolt-like member 4 is adapted to be threadingly engaged with the bores 41 and 45 in lugs 40 and 44, respectively. The member 48 has a flattened portion 48a which includes a bore (not shown) receiving a pin 50 thereby pivotably mounting a clamping arm 52.

Figure 6:
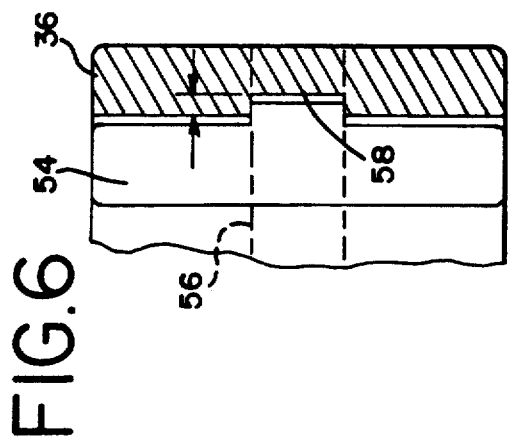
FIG. 6 is cross-sectional view taken along line 6—6 in FIG. 3 and showing the bushing and clamp of the adjustable fence.

The adjustable fence assembly further includes a first arcuate spacer 54 and a second and identical arcuate spacer 55. As shown in FIG. 6, the spacer 54 includes a continuous rib 56 which is received in an arcuate recess 58 formed in the part 36. The second arcuate spacer 55 also includes a continuous rib identical to rib 56, which is received in a recess formed in formation 34 which is identical to recess 58. Thus, it should be apparent that relative horizontal rotation is permitted between the formations 34 and 36, and the spacers 54 and 55. However, vertical axial movement between these parts is not permitted by reason of the interfitting engagement between the ribs 56 and the recesses 58.

Prior to mounting of the adjustable fence assembly 30 on the column 12 of the drill press 10, the part 36 will have been removed from the body 31. The adjustable fence may be readily mounted to the column 12 by interposing the spacers 54 and 55 between column 12 and part 36 and formation 34, with ribs 56 interfitting within recesses 58. It will be noted that the spacers 54 and 55 form an open space 60 (FIG. 3) to receive the gear rack 16 which extends along the column 12. Part 36 then is secured to the body 31 by employing the fasteners 38 and by threading the member 48 in the bore 45 of the lug 44. It will be apparent that the planar surface 32 may be adjustably clamped in an infinite number of vertical and horizontal positions by operation of the manual arm 52.

As shown in FIG. 2, the body member 31 includes a horizontally elongated recess 62 for slidably receiving a stop bar 64 having a right angle formation 64a at one end thereof. Preferably, the stop bar 64 is provided with indicia means (both metric and English) defining a scale. The stop bar 64 facilitates positioning of the workpiece horizontally. The body member 31 also includes an elongated channel 81 for storing a set-up bar 80.

Figure 5:
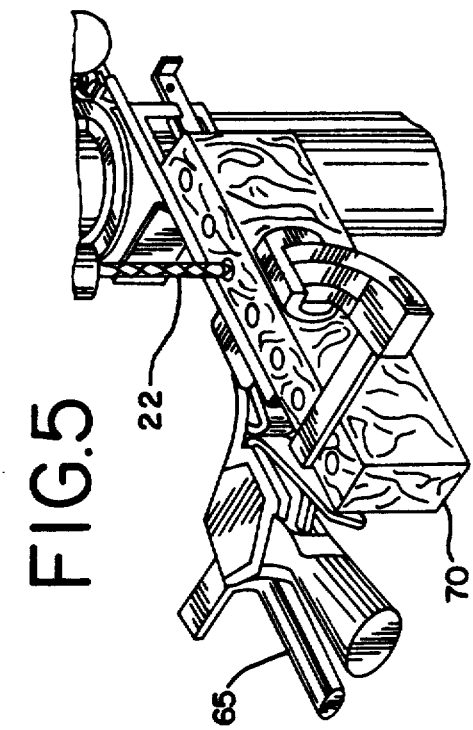
FIG. 5 is a perspective view showing the fence according to the present invention with a workpiece mounted on the fence to illustrate the manner in which the fence facilitates multiple drilling operations on the same workpiece.

Referring to FIG. 4, it is seen that a conventional Quick-Grip clamp 65 may be used to clamp a workpiece 66 against the planar surface 32 of the adjustable fence assembly. To facilitate use of such an adjustable clamp 65, the body member 31 is preferably provided with another planar surface 68 in parallel relationship with the planar surface 32. Turning to FIG. 5, it is seen that the clamp 65 may be used to secure another workpiece 70 against the planar surface 32 of the adjustable fence assembly. In this case, the stop bar 64 may be used to facilitate precise positioning of the workpiece 70 for the repeated drilling of a number of holes at predetermined distances from each other.

The unique fence system of the present invention provides the operator with a highly adjustable vertical work surface. Workpieces can be secured to the fence close to where the drilling operation occurs, thereby greatly reducing movement of the workpiece. The result is a more accurate operation.

In use, the operator will pencil mark the workpiece using a ruler or carpenters square. The fence and workpiece are then moved close to where the drill bit will enter the piece; the fence is locked into position using the lock handle 52. The workpiece is clamped to the fence using one or two C-clamps or similar clamping devices, as shown in FIG. 4, for example. The drilling operation may then begin.

For more precise use, pre-positioning the fence before attaching the workpiece is achieved by using the measuring gauge on the stop bar 64 and by using the set-up rod 80. The operator may mark the workpiece, although this is not necessary. Referring to FIG. 10, the operator will install the set-up rod 80 into the chuck 20. The fence is then moved up to a position just above the bottom of the rod 80 and to its left. The handle 52 will be operated to "snug-up" (but not fully tighten) the fence at the desired height.

The stop bar 64 will have been removed from the slot 62 by loosening screws (not shown) which are received in recesses 85 and 86. It is noted that the stop bar has an aperture 88 in each end thereof centered with respect to the "0" scale mark. The stop bar will be manipulated to receive the set-up rod in one of the apertures 88 depending on whether the operator desires to use the English or metric scales on the stop bar. The stop bar may be rested on the top surface 89 of the fence, as shown in FIG. 10.

The operator will then swing the fence horizontally to the desired distance while reading the scale dimensions at the top edge of the front face 32 of the fence. The stop bar should be perpendicular to the fence face for accurate measurements. The fence is next locked into position using the lock handle 52. The set-up rod may now be removed and replaced with a drill bit or cutting tool bit. Finally, the operator will position the workpiece against the fence and clamp the same to the fence or support the workpiece from the table (see FIG. 4). The drilling operation may now begin.

Turning now to FIGS. 7 through 9, a V-block, generally designated 90, will be seen to include a body 91 having a V-shaped recess defined by inclined planar surfaces 92 and 94. It will be understood that the V-shaped formation is symmetrical with respect to the central axis 95. The body 91 may include a second and smaller V-shaped recess defined by planar walls 92a and 94a disposed in symmetrical relationship to the axis 95.

The body member 91 has a first pair of intermediate spaced lugs 98 and a second pair of end spaced lugs 100. These pairs of lugs may be alternately received within the recess 62 of the fence (when the stop bar 64 is removed) to facilitate mounting of the V-block in close association with the fence, as will be more fully explained below. The V-block 90 also includes a continuous rib 102 extending along one side thereof. This rib 102 may be received within the slot 62 in the fence when it is desired to associate the V-block 90 with the fence in a horizontal orientation.

Referring to FIG. 9, it will be noted that the portion of the V-block which includes the surfaces 92 and 92a is somewhat less in axial extent than the portion of the V-block defining the surfaces 94 and 94a thus forming a rectilinear step formation 104. This step is adapted to be abutted by one edge of a scale or ruler to align that edge with the central axis 95.

The V-block 90 and fence 30 may be employed together for drilling into the center of the flat end of a cylindrical workpiece. The cylindrical workpiece will be received within the selected V-shaped recess defined by the surfaces 92, 94 or 92a, 94a (depending on the size of the workpiece) and the end of the workpiece will be located adjacent the step surface 104. A straight edge or ruler will be positioned against the step 104 and a line will be drawn against the end of the workpiece. The workpiece will be rotated approximately 90 degrees and another line will be drawn. The center of the cylindrical workpiece will be established where the two lines cross.

Figure 11:
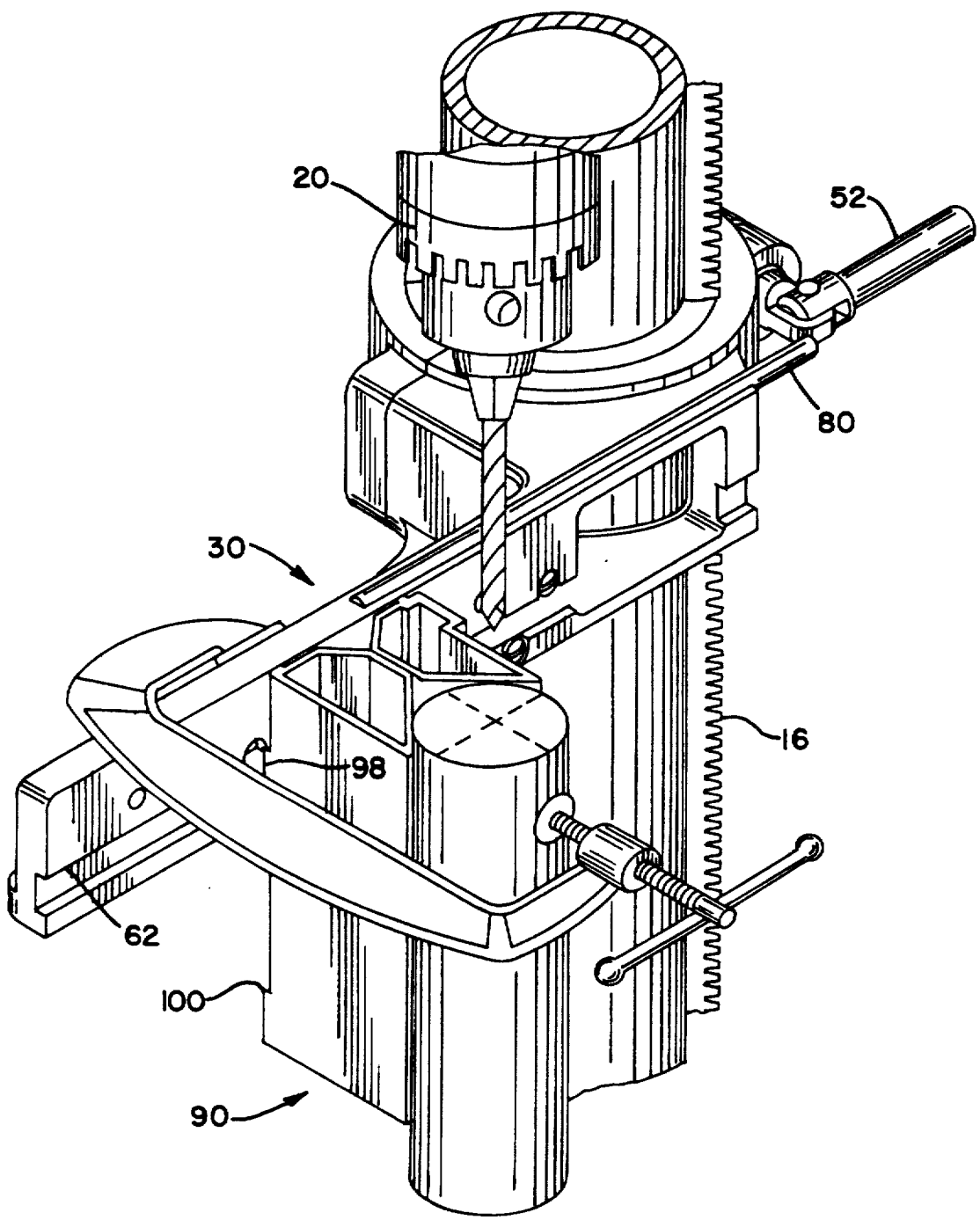
FIG. 11 is an isometric view showing the fence in association with the V-block vertically oriented.

As seen in FIG. 11, the operator then will position the workpiece and the V-block 90 in a vertical position against the face of the fence 30, the lugs 98 being received within the slot 62 formed in the fence. Alternatively, the lugs 100 may be received within the slot 62. After aligning the V-block and the workpiece to just below the end of the drill bit, both the workpiece and the V-block will be clamped to the fence. The drilling operation may then begin.

Figure 12:
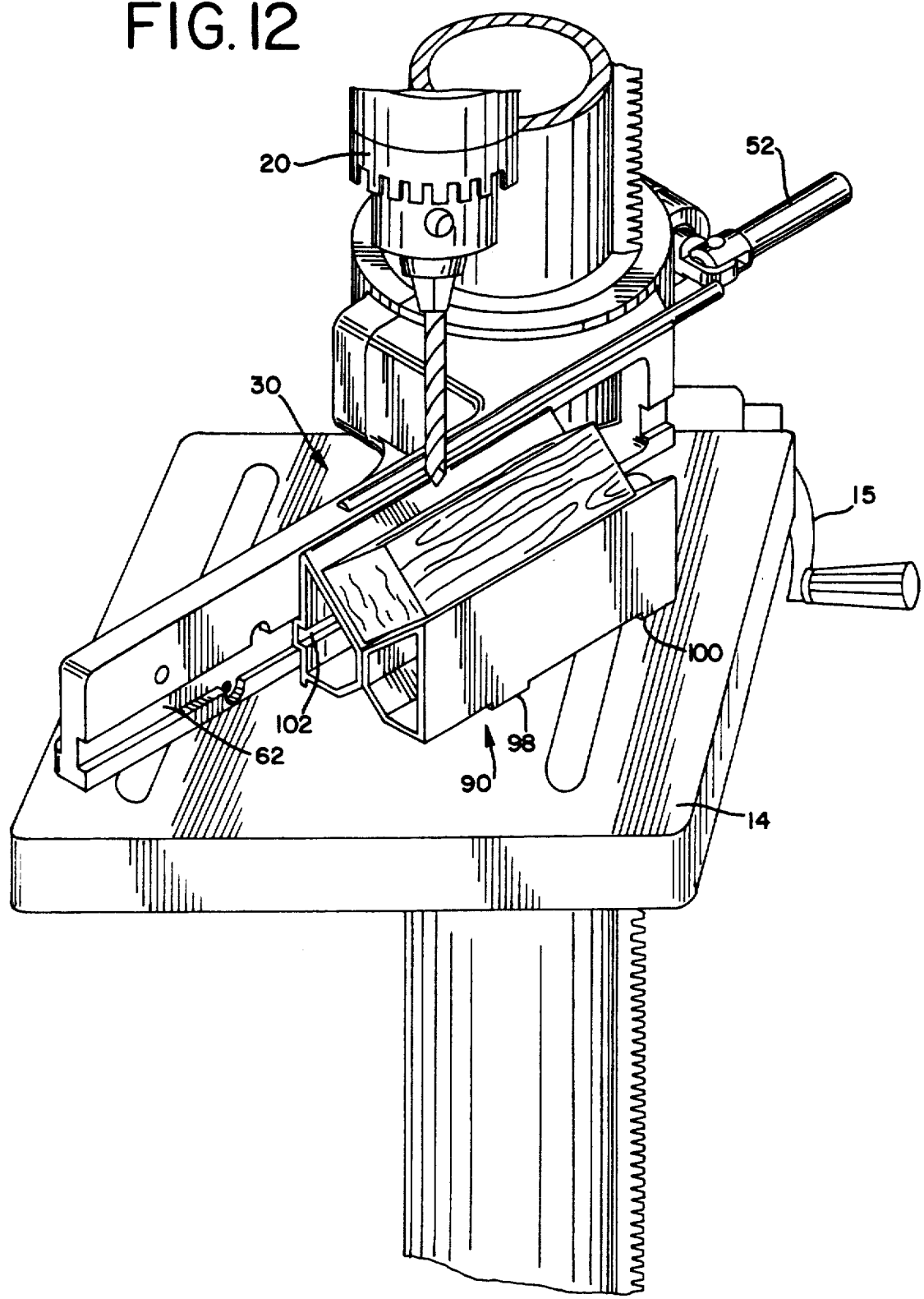
FIG. 12 is an isometric view showing the fence in association with the V-block horizontally oriented.

A V-block may also be used for drilling into the edge of the square workpiece. In this case, and as shown in FIG. 12, the V-block will be horizontally oriented with the selected V-surface facing upwardly and with the rib 102 being received within the slot 62 in the fence. Again, the V-block will be clamped to the fence. The square workpiece may then be received within the V-shaped recess with an edge pointed upwardly. Preferably, the work table 14 will be raised so that the lugs 98 and 100 will engage the table 14 to support the V-block as seen in FIG. 12. The drilling operation may then begin.

While the invention has been shown in but one form, it will be apparent to one of ordinary skill in the art that it is not to be so limited, but rather is susceptible of various changes and modifications without departing from the spirit and scope of the appended claims.

We claim:

1. In a drill press of the type having a column supported by a base, a horizontally disposed work table adjustably supported by the column, and a motor and drill bit assembly supported at the upper end of the column, the improvement comprising, an adjustable fence assembly including a body member and an adjustable clamp assembly, said adjustable clamp assembly being in releasable engagement with said drill press column between said work table and said motor and drill bit assembly, said body member including a planar workpiece engaging surface, said adjustable clamping assembly serving to mount said planar surface in a vertical plane and to permit said body member to be adjusted both horizontally about the central axis of said column and vertically to facilitate locating a workpiece in its desired position beneath the drill bit assembly.

2. The improvement according to claim 1 wherein said planar surface is horizontally elongated and wherein said body member has a stop bar adjustably mounted thereto for horizontal sliding movement thereby to facilitate locating the workpiece in its desired position horizontally with respect to the axis of the drill bit assembly.

3. The improvement according to claim 1 wherein said clamping assembly includes a C-Clamp subassembly and manually operated means for urging said subassembly between open and closed positions thereby to release and establish, respectively, frictional engagement between said subassembly and the column of the drill press.

4. The improvement according to claim 2 wherein said stop bar includes indicia means forming a scale to further facilitate axial positioning of the fence.

5. The improvement according to claim 1 and further defined by, a V-block having a V-shaped recess for receiving a portion of a workpiece, interengaging means on said V-block and said fence body member to facilitate mounting of the V-block relative to the fence.

6. The improvement according to claim 5 wherein said V-block has a V-shaped recess therein and wherein said interengaging means includes cooperating projections and recesses for selectively mounting the V-block to the fence to establish both horizontal and vertical orientations of the V-shaped recess.

* * * * *

UNITED STATES PATENT AND TRADEMARK OFFICE
CERTIFICATE OF CORRECTION

PATENT NO. : 5,318,392

DATED : June 7, 1994

INVENTOR(S) : Svetlik, et al.

It is certified that error appears in the above-indentified patent and that said Letters Patent is hereby corrected as shown below:

Column 3, line 8, change "4" to --48--.

Signed and Sealed this

Twenty-seventh Day of December, 1994

Attest:

BRUCE LEHMAN

*Attesting Officer*     *Commissioner of Patents and Trademarks*